(12) United States Patent
Oboodi et al.

(10) Patent No.: US 7,647,833 B1
(45) Date of Patent: Jan. 19, 2010

(54) FILLED DIELECTRIC ON METAL PRESSURE SENSOR

(75) Inventors: Reeza Oboodi, Morris Plains, NJ (US); James Piascik, Randolph, NJ (US); Lamar Floyd Ricks, Lewis Center, OH (US)

(73) Assignee: Honeywell International Inc., Morristown, NJ (US)

( * ) Notice: Subject to any disclaimer, the term of this patent is extended or adjusted under 35 U.S.C. 154(b) by 15 days.

(21) Appl. No.: 12/194,339

(22) Filed: Aug. 19, 2008

(51) Int. Cl.
*G01L 9/06* (2006.01)
(52) U.S. Cl. .......................................... 73/721; 73/727
(58) Field of Classification Search ........................ None
See application file for complete search history.

(56) References Cited

U.S. PATENT DOCUMENTS

| | | | |
|---|---|---|---|
| 6,247,369 B1 * | 6/2001 | Chapman et al. ............... 73/726 |
| 7,266,999 B2 | 9/2007 | Ricks | |
| 7,516,669 B2 * | 4/2009 | Silverbrook et al. ........... 73/724 |
| 2005/0150303 A1 | 7/2005 | Maitland et al. | |
| 2006/0081055 A1 * | 4/2006 | Silverbrook et al. ........ 73/729.2 |
| 2007/0095144 A1 | 5/2007 | Oboodi et al. | |
| 2008/0110270 A1 * | 5/2008 | Silverbrook et al. ........... 73/724 |
| 2009/0158854 A1 * | 6/2009 | Silverbrook et al. ........... 73/724 |

FOREIGN PATENT DOCUMENTS

WO    WO/2005/081800    9/2005

* cited by examiner

*Primary Examiner*—Andre J Allen
(74) *Attorney, Agent, or Firm*—Patents on Demand, P.A.; Neil R. Jetter

(57) ABSTRACT

A pressure sensing apparatus (1) includes an elastically deformable pressure-sensitive diaphragm assembly (13) having a pressure-sensitive metal or metal alloy diaphragm (14). A functional filled dielectric layer (25) is on the diaphragm and includes a base dielectric material and at least one CTE raising filler. A CTE of the functional filled dielectric layer provides a CTE @ 800° C. $\geq 8$ ppm/° C., such as $\geq 10$ ppm/° C. A plurality of piezoresistive elements (27) are on the functional filled dielectric layer (25).

16 Claims, 1 Drawing Sheet

FILLED DIELECTRIC ON METAL PRESSURE SENSOR

FIELD OF THE INVENTION

The invention relates to thick film-based pressure sensors and pressure-related sensors, and methods for forming the same.

BACKGROUND

For years, those skilled in the art have made continuous efforts to develop pressure sensors that are low in cost and capable of being mass produced, while exhibiting high reliability, sensitivity and linearity. Certain conventionally known pressure sensors have been known to include semiconductor materials with a micromachined sensing diaphragm. In the processing of such structures, a thin diaphragm is often formed in a silicon wafer through chemical etching. Ion implantation and diffusion techniques are then used to drive doping elements into the diaphragm, forming piezoresistive elements whose electrical conductivity changes with strain, such that deflection or deformation of the diaphragm causes a change in resistance of the piezoresistive elements. These changes correspond to the magnitude of pressure applied to the diaphragm. However, silicon is susceptible to chemical attack and erosion, particularly in environments such as where a high-pressure medium is to be sensed. For example, automotive applications that can involve sensing pressures of brake fluid, oil, coolant, transmission fluid, hydraulic fluid, fuel, steering fluid, and engine cylinders, at pressures of two atmospheres or more. For such applications, a pressure sensor must be physically resilient, and resistant to the hostile environment of the sensed medium.

As an alternative to silicon, diaphragms can be formed from metals or ceramics, which tend to be more physically resilient, and resistant to the hostile environment of a sensed medium as compared to silicon. One pressure sensor design positions a sensing component onto a base component comprising a diaphragm assembly that includes a diaphragm at its center, wherein the diaphragm comprises a metal or ceramic. On top of the diaphragm is a dielectric layer. On top of the dielectric layer is generally a plurality of piezoresistive elements.

Although commercially available dielectric compositions, such as DuPont QM44H™, DuPont 5704™, DuPont QS4200™ and ESL 9505-C™, may have good CTE and chemical compatibility with respect to certain ceramic substrates (e.g. alumina), such dielectric compositions generally do not provide have good CTE compatibility and in some cases chemical incompatibility with metal or metal alloy substrates, such as steels. Significantly, CTE mismatches between the substrate material comprising the diaphragm and the dielectric layer on top can result in significant stress caused by differential expansion which can result in bowing and distortion of the diaphragm which can render data from the pressure sensor to be erroneous, or in extreme cases the pressure sensor even becoming inoperable. Bowing and distortion is generally most prevalent in high temperature applications and is also known to occur during fabrication of the pressure sensor itself, particularly during the cool-down cycle associated with the high temperature dielectric firing step (e.g. 850° C.).

SUMMARY

This Summary is provided to comply with 37 C.F.R. §1.73, presenting a summary of the invention briefly indicating the nature and substance of the invention. It is submitted with the understanding that it will not be used to interpret or limit the scope or meaning of the claims.

Embodiments of the present invention provide a pressure sensing apparatus comprising an elastically deformable pressure-sensitive diaphragm assembly having a pressure-sensitive metal or metal alloy diaphragm. A functional filled dielectric layer is on the diaphragm comprising a base dielectric material and at least one CTE raising dielectric filler. A CTE @ 800° C. of the functional filled dielectric layer is $\geq 8$ ppm/° C. A plurality of piezoresistive elements are on the functional filled dielectric layer.

The filler(s) generally comprise 10 to 30% by weight of the filled dielectric, but can comprise 5% to 50% by weight of the filled dielectric. In one embodiment, the CTE of the functional filled dielectric layer provides a CTE @ 800° C.$\geq 10$ ppm/° C., and in another embodiment the CTE @ 800° C.$\geq 12$ ppm/° C. CTE matching between the filled dielectric and the metal or metal alloy diaphragm is generally within 3 ppm/° C., and is typically within 2 ppm/° C. Significantly, improved CTE matching between the diaphragm and the dielectric layer on top of the diaphragm reduces the stress caused by differential thermal expansion which can result in bowing and distortion of the diaphragm.

DETAILED DESCRIPTION

Figure 1:
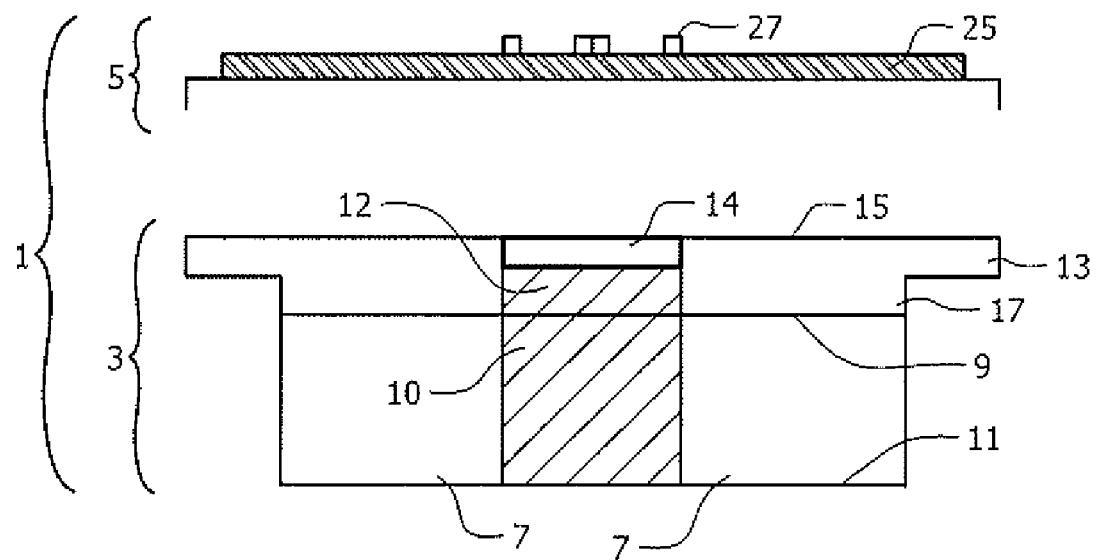
FIG. 1 shows a schematic partially exploded cross sectional view of a pressure sensing component and a base component of a pressure sensing apparatus according to an embodiment of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The invention will now be described more fully hereinafter with reference to accompanying drawings, in which illustrative embodiments of the invention are shown. This invention, may however, be embodied in many different forms and should not be construed as limited to the embodiments set forth herein.

Embodiments of the invention provide a low cost pressure sensing apparatus comprising a metal or metal alloy diaphragm and a functional filled dielectric layer thereon that provides corrosion protection for the diaphragm and CTE matching to the diaphragm. The term "CTE" refers to the coefficient of thermal expansion. The term "CTE @ 800° C." refers to the amount of expansion exhibited by an expansion bar that is heated from room temperature to 800° C., and is selected as the temperature to calculate the CTE since dielectric firing step generally used to form the pressure sensor generally occurs at a temperature $\geqq 800°$ C., such as around 850° C. Unless indicated otherwise, CTE values and CTE matching values as described below refer to CTE values at 800° C.

Such pressure sensing apparatus can be used in various pressure environments, including harsh conditions that can include one or more of high shock (mechanical or thermal), high pressure and corrosive environments. Since the pressure sensing apparatus generally involves bonding two dissimilar materials, the metal or metal alloy diaphragm and the filled dielectric layer coating, in embodiments of the invention the filled dielectric layer composition is designed to minimize the coefficient of thermal expansion (CTE) between these two layers to minimize stresses, particularly during thermal shock and thermal cycling. CTE matching is generally within 3 ppm/° C., and is usually within 2 ppm/° C.

Figure 2:
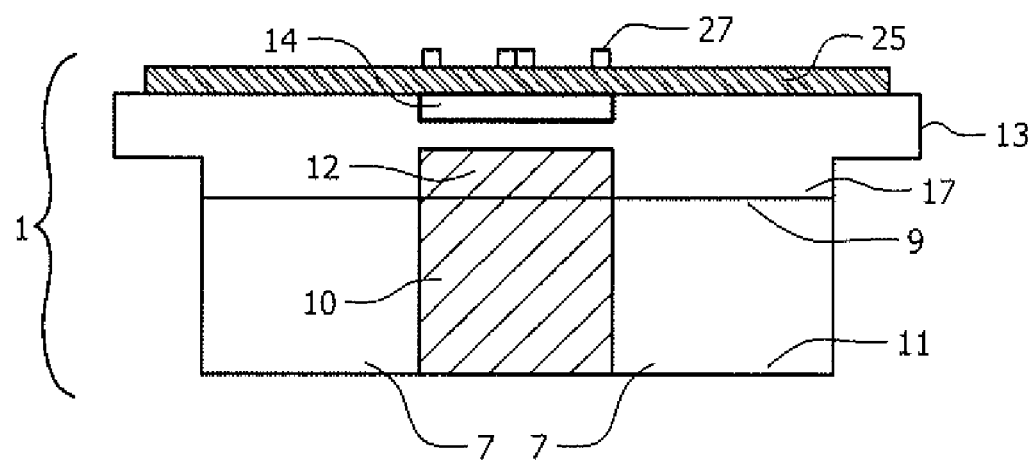
FIG. 2 shows a schematic side view of a pressure sensing apparatus according to the embodiment of the invention shown in FIG. 1.

FIGS. 1 and 2 show a schematic partially exploded cross sectional view and a cross sectional view of a pressure sensing apparatus 1 according to an embodiment of the invention as shown in FIG. 1, pressure sensing apparatus 1 generally including two main components, a sensing component 5, and a base component 3. Although referred to as a pressure sensing apparatus 1, the pressure sensing apparatus 1 can be embodied as a load, torque or a related sensor which operates based on a change of the strain of a material (e.g. diaphragm).

Pressure sensing apparatus 1 comprises a pressure port 7 which includes an upper surface 9 and a base portion 11 surrounding a central inlet 10. Such pressure ports 7 are known in the art, and serve to connect the sensor to pressure media. Typical pressure ports 7 are cylindrical in shape, and range from about ¼ inch (6.35 mm) to about 1 inch (25.4 mm) in diameter, and from about ½ inch (12.7 mm) to 1.5 inches (38.1 mm) in height. The pressure port's base typically includes connection threads around an outer surface of its base portion, for threadably attaching the pressure port to other devices. Such threads typically range from about ¼ inch (6.35 mm) to about 9/16 inch (14.29 mm) in thickness. The pressure port 7 can include a hexagonally threaded portion around the outer surface of its base portion, to allow for tightening the pressure port with a wrench. The pressure port may comprise a variety of materials known in the art of pressure port formation, such as metals including stainless steel, specialty stainless steels, superalloys and the like.

Pressure sensing apparatus 1 also includes an elastically deformable pressure-sensitive diaphragm assembly 13 having upper surface 15 and lower surface 17 and an integral central (or nearly central) pressure-sensitive diaphragm 14 near the center of the upper surface 15. The diaphragm assembly 13 and the pressure port 7 are attached together, and can be attached via welding or the like. The diaphragm assembly 13 including diaphragm 14 comprise a metal or metal alloy. Exemplary materials for the diaphragm assembly 13 can comprise stainless steel, nickel, or combinations and/or alloys thereof. Diaphragm assembly materials can include common stainless steels, such as 300 and 400-series stainless steels and the like; precipitation-hardened stainless steels such as 17-4PH, 15-5PH, 13-8PH and the like; and superalloys. Superalloys are specialty alloy materials known in the art which include a high nickel content and exhibit desirable properties such as high strength, high temperature resistance, oxidation resistance, and the like. Examples of superalloys include INCONEL®, HASTELLOY®, and HAYNES®, which are commercially available.

The diaphragm assemblies 13 shown in FIGS. 1 and 2 can be formed by machining a single piece of metal or metal alloy to form an integral central pressure-sensitive diaphragm 14 near the center of diaphragm assembly 13. The resulting diaphragm assembly 13 includes a diaphragm 14, centrally or near centrally located at an upper surface 15 of the diaphragm assembly 13, and a protruding lower surface 17 at a bottom of the assembly 13. In certain embodiments of the invention, steel is used for the diaphragm assembly 13, such as 400 series stainless steel (e.g. SS-430), which has a CTE of about 11 ppm/° C. The protruding lower surface 17 typically comprises an annular ring or the like having a central inlet 12. When attached to a pressure port 7 having a central inlet 10, the pressure port's central inlet 10 can correspond with the diaphragm assembly's central inlet 12 such that pressures exerted on the pressure port 7 and the diaphragm assembly 13 are indicated by deformations of the diaphragm 14.

The diaphragm 14 generally has a substantially consistent thickness throughout, such that its thickness is substantially the same at its center and its edges. Size and shape characteristics of the diaphragm 14 will depend on environmental factors and be determined by those skilled in the art, since the diaphragm's geometry, thickness, and diameter will determine the usable pressure range of the overall pressure sensor. For example, for use in a high pressure environment, the thickness of the diaphragm is increased and its diameter is decreased. For lower pressure environments, the thickness of the diaphragm is decreased and its diameter is increased. The diaphragm 14 can have a thickness ranging from about 0.025 mm to about 4.5 mm, such as from about 0.051 mm to about 1.83 mm, or from about 0.076 mm to about 0.91 mm. The diaphragm 14 can have a diameter ranging from about 0.3 mm to about 30 mm or more, such as from about 0.51 mm to about 1.83 mm or from about 0.76 mm to about 0.91 mm.

The diameter of the diaphragm assembly 13 will vary, generally depending on the diameter of the diaphragm 14. That is, the diameter of the diaphragm assembly 13 is at least equal to the diameter of the diaphragm 14. The ratio of the entire diaphragm assembly's diameter to diaphragm's diameter generally ranges from about 1.1:1 to about 5:1.

On top of the diaphragm 14 is a functional filled dielectric layer 25 according to an embodiment of the invention comprising a dielectric base material and one or more CTE raising filler materials. The functional filled dielectric 25 provides electrical isolation between the metal or metal alloy diaphragm assembly and diaphragm 13, 14 and the sensing elements 27 above the functional filled dielectric 25.

As defined herein, the base dielectric material comprises $\geqq 50\%$ by weight of the functional filled dielectric. The base material can generally comprise up to 95% by weight of the filled dielectric. The balance of the filled dielectric is provided by the filler(s). The one or more fillers which comprise different compositions as compared to the base material generally comprise the balance of the functional filled dielectric. The functional filled dielectric layer provides a CTE$\geqq 8$ ppm/° C., with the filler(s) each providing a CTE$\geqq 8$ ppm/° C. As described below, some fillers provide a CTE$\geqq 9$ ppm/° C., with other fillers providing a CTE of 10$\geqq$ppm/° C.

A plurality of piezoresistive sensing elements 27 are disposed on the functional filled dielectric layer 25. The piezoresistive sensing elements 27 are generally arranged as a bridge circuit, which provides an output proportional to the applied force received from diaphragm 14 responsive a force received at pressure port 7. A flex circuit (not shown) comprising an ASIC (Application Specific Integrated Circuit), associated circuitry and EMI protection can be provided to provide signal conditioning, calibration and compensation, which can be coupled to the piezoresistive sensing elements 27.

The dielectric base material in functional filled dielectric 25 can be based on one or more commercially available thick film dielectric materials. A few commercially available thick film dielectric materials provide a CTE of $\geq 6$ ppm/° C. Exemplary commercially available thick film dielectric materials that provide a CTE$\geq 6$ ppm/° C. include Heraeus Cermalloy SD-2000™ dielectric (available from Cermalloy, Conshohocken, Pa.) which comprises 10-15% aluminum oxide, and is reported to have a CTE of 7 to 8 ppm/° C. Other generally suitable commercially available thick film dielectrics include DuPont 3500N™ and ESL 4987™. These commercial dielectrics generally comprise oxides of Si, B, Al, Zn and/or oxides of alkaline earth metals (Mg, Ca, Sr and Ba). After deposition, the dielectric surface can be roughened, such as by using bead or grit blasting or chemical etching to improve the bonding to a subsequently deposited layer (piezoresistive layer).

Even commercially available dielectrics that purport to be compatible with steels including series 400 stainless steels, such as Heraeus Cermalloy SD-2000™, DuPont 3500N™ and ESL 4987™, as described above, still generally create a $\geq 3$ ppm/° C. expansion mismatch, even with relatively low CTE series 400 stainless steels. The CTE mismatch is even greater when higher CTE austenitic steels (CTE about 17 ppm/° C.) or superalloys such as Hastelloy C-22 (CTE of about 15.8 ppm/° C.) are used. Such austenitic and superalloy steels can provide improved performance in demanding applications or when corrosion is an issue. As described above, embodiments of the invention add one or more CTE raising filler materials to base dielectric materials to increase the CTE of the functional filled dielectric layer (25) to generally within 3 ppm/° C., and usually within 2 ppm/° C., with respect to the metal or metal alloy diaphragm material, Fillers can also reinforce the resulting functional filled dielectric matrix formed after processing, give dimensional stability to the matrix and promote crystallization of any glass constituents that may be present.

The fillers for functional filled dielectric 25 can include one or more selections from the relatively low percentage of ceramic compositions that have CTEs>10 ppm/° C. As known in the art, a "ceramic" refers to inorganic non-metallic materials which are formed by the action of heat, with most ceramic materials being dielectric materials. Fillers that can be used with embodiments of the invention can comprise certain ceramic oxides including zirconia compounds such as yttria stabilized zirconia (YSZ) which provides a CTE of about 10.5. Zinc oxide, which although by itself does not have a high CTE (~2.9-4.7), in the presence of some silicate glasses is known to react with the silicate glasses to form high CTE, phases having a CTE of 12 to about 31 ppm/° C. Fillers can also include certain ceramic non-oxide ceramics. Certain micas can be used including $KAl_2Si_3O_{10}(OH)_2$. Phlogopite mica, potassium magnesium silicate, $KMg_3Si_3AlO_{10}(OH)_2$, $KAlSiO_4$ (orthorhombic kalsilite) 16 ppm/° C. Relatively high CTE, high MP glasses in particle form can also generally be used as fillers. The table below provides the composition, glass transition temperature (Tg) and CTE for two exemplary glass compositions, shown below as Comp. 1 and 2.

| Comp. | Composition (mol %) | | | | | | | Tg (° C.) | CTE (ppm/° C.) |
| --- | --- | --- | --- | --- | --- | --- | --- | --- | --- |
| | BaO | La2O3 | Al2O3 | B2O3 | SiO2 | MgO | SrO | | |
| 1 | 16.1 | 0 | 0 | 15 | 21.4 | 47.5 | 0 | 780 | 11 |
| 2 | 0 | 20.2 | 10 | 36.6 | 4.6 | 0 | 28.7 | 760 | 11.5 |

Filler(s) are generally provided in powder form and mixed with the dielectric base material, along with carrier solvent (e.g. alpha-terpineol), an organic binder (e.g. ethyl cellulose) and surfactant to form a homogeneous or near homogenous thick film paste. Exemplary mixing processes include high shear mixing and 3-roll mill processing. Following firing, the filled dielectric comprises the base dielectric and the filler(s) since the carrier solvent, organic binder, and surfactant are removed by the firing step.

The thickness of the functional filled dielectric 25 is generally in a range from about 0.025 mm to about 0.1 mm, such as from about 0.025 mm to about 0.075 mm, or from about 0.040 mm to about 0.060 mm.

The CTE of a functional filled dielectric according to embodiments of the invention is generally determined experimentally. The attainable maximum CTE for a functional filled dielectric according to an embodiment of the invention generally depends on the CTE of the filler material used and the amount of filler that can be added to the dielectric base material without imparting a porosity level deemed too high. As a first approximation, the CTE for functional filled dielectrics according to embodiments of the invention can be approximated by the law of mixtures.

The filled dielectric layer 25 may be deposited on the diaphragm assembly 13 and diaphragm 14 using a variety of methods. In certain embodiments of the invention, the filled dielectric layer 25 is formed as paste (e.g. high shear mixing and 3-roll mill processing) that may be screen printed on the diaphragm assembly 13 and diaphragm 14, dried in an oven at a temperature of about 150° C., and fired at temperatures of about 850 to 950° C. to form such a coating. Several layers of paste can be dried independently and fired (co-fired) together in forming the filled dielectric layer 25. As few as one, or up to 8 or more paste layers may be applied in this way. The thickness of the filled dielectric layer 25 after firing generally ranges from about 0.01 mm to about 0.2 mm microns in thickness, such as from about 0.03 mm to about 0.09 mm in thickness or from about 0.04 mm to about 0.06 mm in thickness.

Next, the plurality of piezoresistive elements 27 are formed on the filled dielectric layer 25. The piezoresistive elements 27 translate pressure into electrical signals. Generally, at least a portion of the piezoresistive elements 27 are present at a location above the diaphragm 14.

Such piezoresistive elements 27 are well known in the art, and are commercially available. They often comprise a composite of ruthenium oxide in a glass matrix. Such piezoresistive elements 27 are generally formed on the filled dielectric layer 25 to form a Wheatstone bridge. The individual piezoresistive elements 27 can vary in size as determined by those skilled in the art. Generally, these elements range in size from about 0.5 mm×0.5 mm to about 2.5 mm×2.5 mm. As described above, the piezoresistive elements 27 may further be electrically connected to a signal detection circuitry, such as an Application Specific Integrated Circuit (ASIC).

Bonding between layers may be conducted using any conventionally known method such as by melt bonding, gluing, soldering, brazing, and the like. Suitable bonding materials nonexclusively include organic adhesives such as structural epoxies, perform epoxy films, epoxy paste; glass materials such as glass performs, glass paste; ceramics; metal materials such as metal solder or braze, or combinations thereof. In one embodiment the bonding material comprises an epoxy adhesive. In another embodiment the bonding material comprises a metal solder or braze.

Bonding temperature and processes depend on the bonding materials used. Epoxies normally cure at room temperature to about 200° C., solders melt at about 180° C. and higher, preferred glass pastes or pre-forms melt at temperatures ranging from about 500° C. to about 700° C.

The pressure sensing apparatus 1 according to embodiments of the present invention may be used in a variety of applications, and are particularly well suited for corrosive and very high pressure environments. Apparatus 1 is also useful in medium or low pressure environments as well. For example, pressure sensing apparatus 1 may be useful at pressures ranging from as low as 50 psi to about 20,000 psi or above, depending on diaphragm design and diaphragm assembly design. The pressure sensing apparatus 1 may also be used at a variety of temperatures, such as within the range of from about −40° C. to about 150° C. The following non-limiting examples serve to illustrate the invention. It will be appreciated that variations in proportions and alternatives in elements of the components of the invention will be apparent to those skilled in the art and are within the scope of the present invention.

EXAMPLES

The following non-limiting Examples serve to illustrate selected embodiments of the invention. It will be appreciated that variations in proportions and alternatives in elements of the components shown will be apparent to those skilled in the art and are within the scope of embodiments of the present invention.

Transducer apparatus according to embodiments of the invention can be formed via a filled dielectric layer on-metal technology adapted for use as a pressure sensor design that can be constructed at a low-cost. Processes that are utilized for the formation transducer apparatus 1 can include molecular bonding of the filled dielectric layer 25 to a metal diaphragm, such as, for example, metal diaphragm assembly and diaphragm 13, 14, followed thereafter by welding of the metal diaphragm (i.e., metal diaphragm sensor) to the input pressure port 7.

A paste comprising a filled dielectric according to an embodiment of the invention, a carrier solvent (e.g. alpha-terpineol), an organic binder (e.g. ethyl cellulose) and surfactant was formed. The base dielectric was an aluminum oxide comprising dielectric and the filler was the high CTE zinc oxide/silicate glass filler described above. The paste was formed by physical mixing.

Several filled dielectrics having 50 to 95% of a the base dielectric material with the balance being the high CTE zinc oxide/silicate glass filler described above were prepared. The resulting CTE was found to be in the range of 12 to 18 ppm/° C. depending on the filler concentration.

The filled dielectric paste was molecularly bonded to the metal diaphragm utilizing an ATF (Advanced Thick Film) process. The metal or metal alloy diaphragm is therefore formed as a dielectric coated article having a metal core (i.e., the metal of the metal diaphragm) and having on at least a portion of the surface of the metal core a coating of a filled dielectric.

Ceramic/glasses adapted for use with the transducer apparatus 1 described herein, generally possess high temperature re-firing capabilities (e.g., 850° C.), and are air fireable. Moreover, dielectric coated article can exhibit a composite thermal coefficient of expansion which is optimum for use in electronic devices, and which can exhibit a low dielectric constant (e.g. <10, such as <5) which allows for use with high frequency circuits and allows for greater applicability in electronic applications.

Furthermore, the filled dielectrics utilized via the ATF process thereof can exhibit strong adhesion to the metal substrate after firing and are very resistant to thermal stress. This avoids breakdown of the devices formed from the filled dielectric coated article of this invention when such articles are exposed to high temperatures normally encountered in the operation of electronic devices.

Such an ATF process additionally can include heating the coated/metal substrate combination of step at a second temperature for a time sufficient to remove substantially all of the solvents or other volatiles from the applied suspension; and heating the coated/metal substrate combination of step at a third temperature for a time sufficient to degrade substantially all of the binders in the applied suspension; heating the coated/metal substrate combination at a fourth temperature for a time sufficient to sinter the non-conductive material to form a device comprising a metal substrate having a predetermined pattern of filled dielectric material bonded to one or more surfaces thereof. The method can include the step of heat treating the device at a fifth temperature for a time sufficient to re-crystallize any residual glass contained in the material to any extent.

The ATF process provides for greater selectivity in the application of the filled dielectric materials to specific sites on a substrate which provides for greater freedom in the manufacture of devices such as the transducer apparatus 1. After processing, in accordance with embodiments disclosed herein, the coating can contain crystallized glass/ceramic, which strongly adheres to the metal core and can be suitable as a substrate for processed induced components. An example of an ATF process is disclosed in U.S. Pat. No. 4,794,048 entitled, "Ceramic Coated Metal Substrates for Electronic Applications," which issued to Oboodi et al on Dec. 28, 1988, and which is incorporated herein by reference for its ATF teaching. Another example of an ATF process is disclosed in U.S. Pat. No. 4,997,698 entitled "Ceramic Coated Metal Substrates for Electronic Applications," which issued to Oboodi et al on Mar. 5, 1991, and which is incorporated herein by reference for its ATF teaching.

Piezoresistive elements can then be formed on the filled dielectric layer by first screen printing a conductive gold paste onto the filled dielectric. The conductive paste is then dried on the filled dielectric in an oven for 10-15 minutes at 150° C.

The conductive paste is then fired on the filled dielectric coating for 60-90 minutes at 850° C. to form a conductive layer having a thickness of about 10 microns. A resistor paste is then screen printed onto the conductive layer. The resistor paste is then dried on the conductive layer in an oven for 10-15 minutes at 150° C. The resistor paste is then fired on the conductive layer for 60-90 minutes at 850° C. to form a resistor layer having at thickness of about 0.02 mm.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, white a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and/or the claims, such terms are intended to be inclusive in a manner similar to the term "comprising."

The invention claimed is:

1. A pressure sensing apparatus comprising:
    a pressure port having an upper surface and a base portion;
    an elastically deformable pressure-sensitive diaphragm assembly having an upper surface, lower surface and a pressure-sensitive diaphragm;
    said lower surface of said diaphragm assembly being attached onto said upper surface of the pressure port, wherein said diaphragm comprises a metal or metal alloy;
    a functional filled dielectric layer on said diaphragm comprising a base dielectric material and at least one CTE raising filler, a CTE of said functional filled dielectric layer having a CTE @ 800° C.$\geq$8 ppm/° C., and
    a plurality of piezoresistive elements on said functional filled dielectric dielectric layer.

2. The apparatus of claim 1, wherein said CTE of said functional filled dielectric layer is $\geq$10 ppm/° C.

3. The apparatus of claim 1, wherein said diaphragm is integrally formed from a single material with said diaphragm assembly.

4. The apparatus of claim 1, wherein said filler comprises 10 to 30% by weight of said filled dielectric layer.

5. The apparatus of claim 1, wherein said diaphragm assembly comprises a steel.

6. The apparatus of claim 5, wherein a CTE match @ 800° C. between said steel and said functional filled dielectric layer is $\leq$2 ppm/° C.

7. The apparatus of claim 1, wherein said filler comprises at least one of yttria stabilized zirconia (YSZ), zinc oxide/silica glass, a mica, or a glass comprising material including a plurality of different oxides.

8. The apparatus of claim 1, wherein said piezoresistive elements are arranged in a bridge circuit configuration.

9. The apparatus of claim 1, wherein said functional filled dielectric layer is molecularly bonded to said diaphragm.

10. A method for forming a pressure sensing apparatus, comprising:
    bonding a metal or metal alloy comprising diaphragm assembly including diaphragm to a functional filled dielectric layer to form a dielectric surface thereof, said functional filled dielectric layer comprising a base dielectric material and at least one CTE raising filler, a CTE of said functional filled dielectric layer having a CTE @ 800° C.$\geq$8 ppm/° C.;
    forming a bridge circuit comprising a plurality of piezoelectric elements on said dielectric surface;
    providing an input pressure port for pressure sensing thereof, wherein said input pressure port is connected to said diaphragm to form said pressure sensing apparatus.

11. The method of claim 10, wherein said bonding comprises molecular bonding.

12. The method of claim 10, wherein said CTE of said functional filled dielectric layer 250 is $\geq$10 ppm/° C.

13. The method of claim 10, wherein filler comprises 10 to 30% by weight of said functional filled dielectric layer.

14. The method of claim 10, wherein said diaphragm assembly comprises a steel.

15. The method of claim 14, wherein a CTE match @ 800° C. between said steel and said functional filled dielectric layer is $\geq$2 ppm/° C.

16. The method of claim 10, wherein said filler comprises at least one of yttria stabilized zirconia (YSZ), zinc oxide/silica glass, a mica, or a glass comprising a plurality of oxides.

* * * * *